Oct. 5, 1965         J. A. HAEBER           3,209,829
          WELLHEAD ASSEMBLY FOR UNDERWATER WELLS
Filed May 8, 1961                       7 Sheets-Sheet 1

INVENTOR:

J. A. HAEBER

BY: J. H. McCarthy
        HIS AGENT

Oct. 5, 1965   J. A. HAEBER   3,209,829
WELLHEAD ASSEMBLY FOR UNDERWATER WELLS
Filed May 8, 1961   7 Sheets-Sheet 2

INVENTOR:
J. A. HAEBER
BY: J. H. McCarthy
HIS AGENT

Oct. 5, 1965 J. A. HAEBER 3,209,829
WELLHEAD ASSEMBLY FOR UNDERWATER WELLS
Filed May 8, 1961 7 Sheets-Sheet 3

INVENTOR:
J. A. HAEBER
BY: A. H. McCarthy
HIS AGENT

Oct. 5, 1965   J. A. HAEBER   3,209,829
WELLHEAD ASSEMBLY FOR UNDERWATER WELLS
Filed May 8, 1961   7 Sheets-Sheet 4

INVENTOR:
J. A. HAEBER
BY: A. H. McCarthy
HIS AGENT

Oct. 5, 1965  J. A. HAEBER  3,209,829
WELLHEAD ASSEMBLY FOR UNDERWATER WELLS
Filed May 8, 1961  7 Sheets-Sheet 5

INVENTOR:
J.A. HAEBER
BY: J. H. McCarthy
HIS AGENT

INVENTOR:
J. A. HAEBER
BY:
HIS AGENT

Oct. 5, 1965   J. A. HAEBER   3,209,829
WELLHEAD ASSEMBLY FOR UNDERWATER WELLS
Filed May 8, 1961   7 Sheets-Sheet 7

INVENTOR:
J.A. HAEBER
BY: A. H. McCarthy
HIS AGENT

United States Patent Office 3,209,829
Patented Oct. 5, 1965

3,209,829
WELLHEAD ASSEMBLY FOR UNDER-
WATER WELLS
John A. Haeber, Houston, Tex., assignor to Shell Oil Company, New York, N.Y., a corporation of Delaware
Filed May 8, 1961, Ser. No. 108,463
20 Claims. (Cl. 166—66.5)

This invention relates to an underwater wellhead for use on offshore wells and pertains more particularly to wellhead apparatus adapted to be securely locked on a well casinghead positioned underwater. The present invention is especially concerned with apparatus for use in hanging an additional string of well casing in a well which has been drilled at an offshore location.

In an attempt to locate new oil fields, an increasing amount of well drilling has been conducted at offshore locations, such for example, as off the cost of Louisiana, Texas and California. As a general rule, the strings of casing in an offshore well, together with the tubing strings or string, extend to a point above the surface of the water where they are closed in a conventional manner that is used on land wells, with a conventional wellhead assembly being attached to the top of the casing strings. Methods and apparatus have recently been provided for drilling and completing a well wherein both the well casinghead and subsequently the wellhead assembly and casinghead equipment are located underwater at a depth sufficient to allow ships to pass over them. Preferably, the casinghead and the wellhead equipment are located close to the ocean floor. In order to install equipment of this type underwater in depths greater than the shallow depths at which a diver can easily operate, it has been necessary to design entirely new equipment for this purpose. Thus, during the drilling, casing, completion and production of oil and gas wells at offshore locations which have been drilled and completed in a manner described in copending patent application, Ser. No. 830,538, filed July 30, 1959, and entitled Underwater Well Completion Method, various pieces of equipment may be remotely connected to the underwater wellhead.

During the drilling of an underwater well it is generally necessary to connect various pieces of equipment such as blowout preventers or marine conductor pipes to a wellhead assembly situated on the ocean floor. For this purpose a wellhead connector as described in copending application, Ser. No. 830,538, filed July 30, 1959, may be used. After the well has been drilled, the wellhead equipment may be mounted on top of the well casinghead and securely locked and sealed in place by means of the wellhead connector or lockdown apparatus described in copending patent application, Ser. No. 834,096, filed August 17, 1959, now Patent No. 3,064,735.

Prior to drilling a well a casing program is drawn up for each well in order to select the desired number of strings of casing to be run in the well as well as the diameters and thickness of the casing and the materials of which they are made. A wellhead assembly including a casinghead and/or a tubing and casing suspension assembly to handle the casing program is fabricated for use on the well at the underwater location.

Heretofore, once the casing program had been selected and the underwater wellhead fabricated, it was impossible for the casing program to be changed once the wellhead assembly was secured to well casing below the surface of the water.

It is therefore a primary object of the present invention to provide apparatus whereby the casing program on an underwater well may be changed even after the wellhead assembly has been positioned on the ocean floor.

A further object of the present invention is to provide an apparatus whereby an additional string of well casing may be run into a well and suspended from an underwater wellhead assembly by means remotely operated from an operating platform above the surface of the water.

Another object of the present invention is to provide an underwater wellhead, the component parts of which may be successively lowered through the water from a remote location as strings of casing are run into the well.

As wells are drilled deeper, there is a greater chance for a well casing to stick to the wall of a well borehole due to differential pressures inside and outside the casing which may make it impossible to run or insert the entire predetermined length of a well casing in the well so that its casing hanger at the upper end thereof is seated in the underwater wellhead or casinghead assembly. Additionally, there may be some caving of the formations in the well which prevent the entire length of well casing from being run into the well to its seated position in the underwater casinghead.

It is therefore another object of the present invention to provide means for running an additional string of casing into an underwater well, the string of casing being of undetermined length, with apparatus being provided on the wellhead assembly for being remotely attached to and seated in the wellhead assembly.

These and other objects of this invention will be understood from the following description taken with reference to the drawing, wherein.

Figure 1:
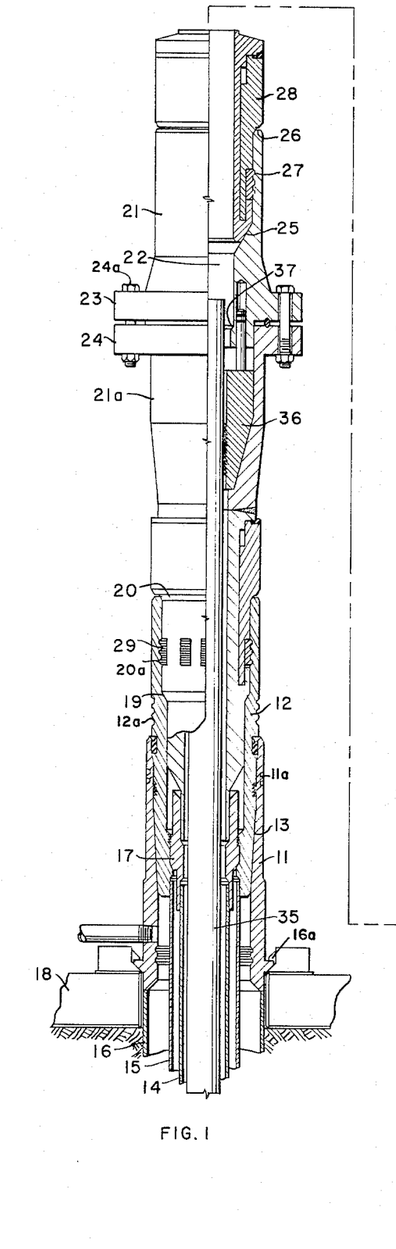
FIGURES 1 and 1A are views taken partly in longitudinal cross-section diagrammatically illustrating blowout preventers mounted on apparatus of the present invention which is in turn mounted on a wellhead assembly or casinghead.

Referring to FIGURE 1 of the drawing a typical underwater well installation incorporating the apparatus of the present invention comprises an underwater casinghead 11 having a casing and tubing suspension body 12 positioned therein on a seat 13. A series of strings of casing 14, 15 and 16 are suspended from the assembly with the innermost string 14 being secured to a suitable hanger 17. The top of the intermediate casing string 15 is fixedly secured as by welding or screw threads to the lower end of the casing and tubing suspension body 12 while the outermost casing string or conductor string 16 is fixedly secured, preferably by welding, to the casinghead 11. The casinghead 11 in turn as attached preferably by latches 16a, to a base member 18 which rests on the ocean floor. While the casinghead 11 is illustrated with a casing and tubing suspension body 12 suspended therein, in some installations the casing and tubing suspension body may form an integral part of the casinghead 11.

The casing and tubing suspension body 12 is preferably provided on the inner wall thereof with a landing shoulder 19 although the upper end 20 of the casing and tubing suspension body 12 may also serve as a landing shoulder, alternatively. The interior wall of the casing and tubing suspension body member 12 may be provided with one or more recesses or circumferential grooves 20a which may be engaged by latching mechanism or wellhead units to be inserted into the top of the casing and tubing suspension body 12. The casinghead 11 and the casing and tubing suspension body 12 may be provided with external recesses or circumferential grooves 11a and 12a, respectively, to which a wellhead connector and/or blowout preventer may be latched.

Positioned on the top of the casing and tubing suspension body 12, either within the bore in the upper end thereof or on the top and extending down the outside thereof, is a landing spool assembly 21–21a in accordance with the present invention which is provided with a vertical bore 22 therethrough. Although the landing spool assembly of the present invention may be a unitary structure, for ease of construction and maintenance it is preferably fabricated into upper and lower landing spool assembly units 21 and 21a when a slip assembly is mounted therein. The upper and lower portions of the spool assembly 21 and 21a may be connected together in any suitable fluidtight manner by means of any connector well known to the art, such for example, as flanges 23 and 24 and bolts 24a. The upper end of the landing spool assembly 21–21a is provided with a landing shoulder 25 which may be formed on the inner wall of the spool member 21 or may take the form of the upper end 26 of the unit. Additionally, the inner wall of the upper spool member 21 may be provided with internal recesses or grooves 27 for accommodating a latch mechanism of a seal-and-lockdown connector 28 carried at the bottom of one or more blowout preventers 31 and 32 of FIGURE 1A. The upper end of the uppermost blowout preventer 32 is provided with suitable connector means for connecting the blowout preventer to a marine conductor string or pipe string 34 in a manner described in copending application, Ser. No. 830,538, filed July 30, 1959. Since the blowout preventers 31 and 32 and their connector 33 do not constitute the important part of their present invention, they will not be further described here.

Figure 1A:
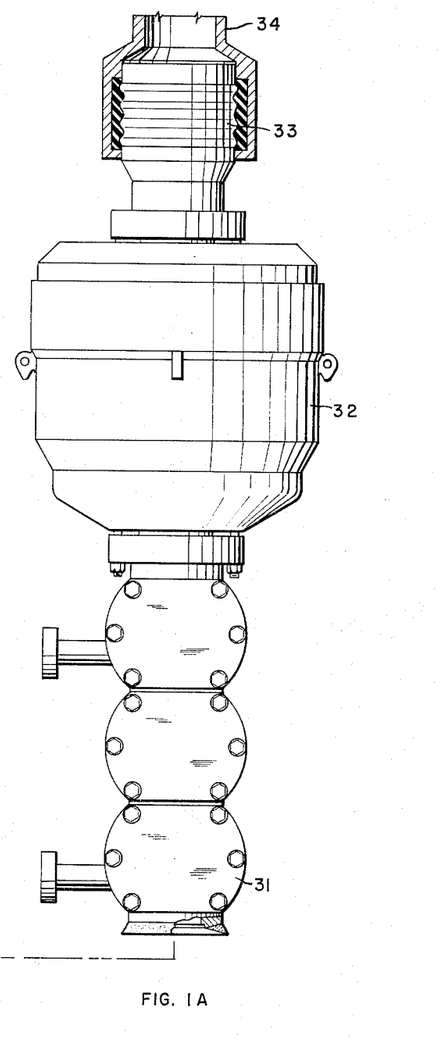
Figure 2:
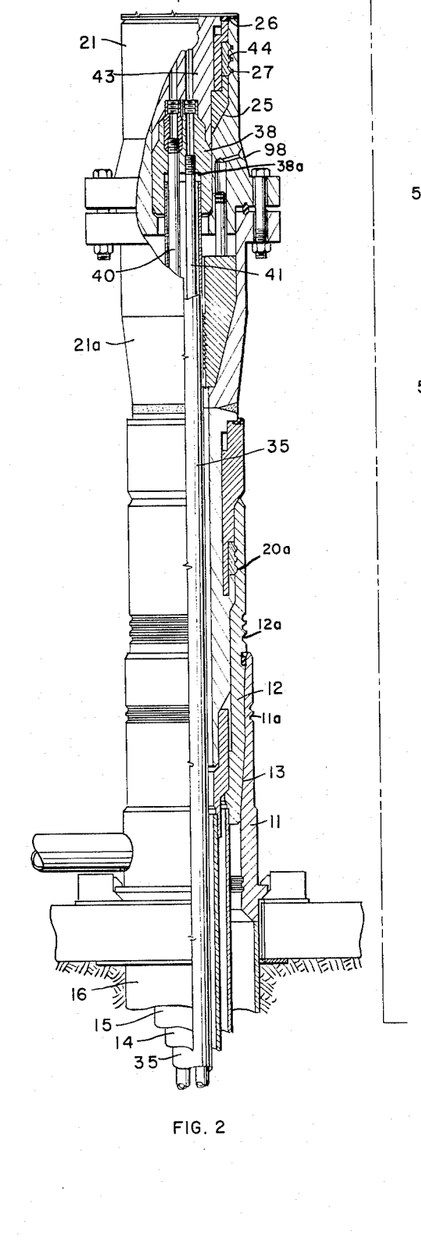
FIGURES 2 and 2A are views taken partly in longitudinal cross-section of a production wellhead assembly diagrammatically illustrated as being mounted on the apparatus of the present invention which is in turn mounted on an underwater well casinghead.

In FIGURE 1 the wellhead assembly is illustrated as being provided with an additional string of well casing 35 which is held in place by a set of slips 36, illustrated diagrammatically, which are described in greater detail hereinbelow. The lower end of the landing spool member 21 is also provided with a second landing surface 37 on which a tubing hanger may be hung. In FIGURE 2 a tubing hanger 38 is shown as being seated on the landing surface 37 in the lower portion of the landing spool member 21 for suspending a pair of tubing strings 40 and 41 within the innermost casing string 35. The tubing hanger 38, in this particular arrangement of equipment, has a central bore 38a in the bottom thereof of a size to fit over the upper end of the casing string 35. Instead of the top of the landing spool assembly 21 being closed by the seal-and-lockdown unit 28 of a blowout preventer 31 as illustrated in FIGURE 1, the landing spool assembly 21 in FIGURE 2 is illustrated as being closed by the seal-and-lockdown unit of a production assembly of the type described in copending patent application, Ser. No. 834,096, filed Aug. 17, 1959, now Patent No. 3,064,735. The wellhead production unit 42 is provided with a seal-and-lockdown unit 43 extending downwardly therefrom which is provided with a plurality of latching dogs 44 adapted to seat in the recesses or grooves 27 in the inner surface of the landing spool member 21 near the top thereof. Briefly, the wellhead production assembly, when used with a two tubing string system, is provided with a series of flow control valves, 45, 45a, 46 and 47 which control the flow from the dual tubing strings 40 and 41 which passes up through the wellhead production assembly to be discharged out at least one of a pair of side conduits 51 and 52 which may come off the wellhead production assembly at right angles but preferably branch off the assembly in a general sloping curve, as illustrated, thus permitting objects such as well instruments, tools, logging devices, etc., to be circulated down through the wellhead to the bottom of the well. It is obvious that only half the number of valves would be needed if a single tubing string was employed.

Other flow-controlling shut-off valves, often called swabbing valves 48 and 49, are fixedly secured to the wellhead production assembly so as to control the flow through the vertical bores thereof, in a manner described in copending application, Ser. No. 834,096, filed Aug. 17, 1959, now Patent No. 3,064,735. The branch conduits 51 and 52 are preferably provided with remotely-controlled flow control valves 54 and 55 of any suitable design at a point near the spool piece 53, although in many installations these valves may be at the discharge end of the conduits 56 and 57, which conduits are shown in FIGURE 2 as being connected to the valves 54 and 55.

Figure 2A:
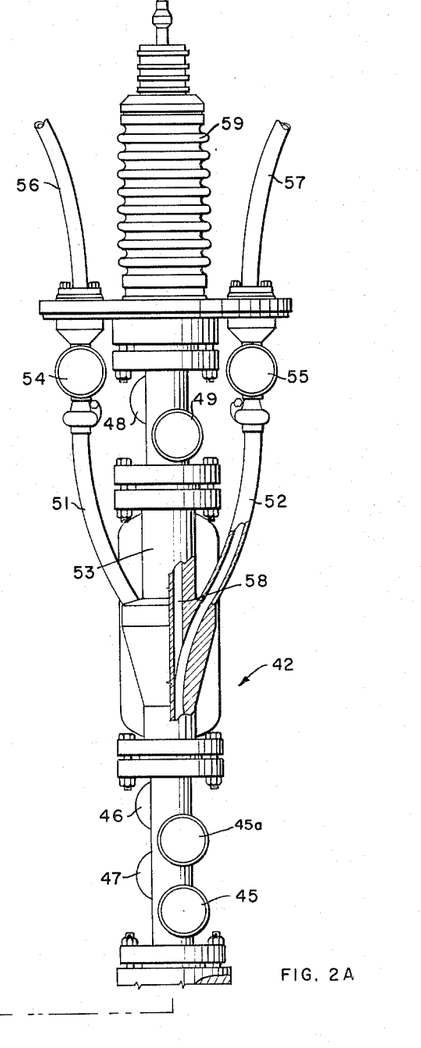

When the spool piece 53 has side conduits 51 and 52 which are curved or branched therefrom as illustrated in FIGURE 2A of the drawing, the vertical bores through the spool piece 53 are preferably provided with a pair of tubing plugs 58, one of which is shown. The top of the wellhead production assembly 42 may be closed in any suitable manner, such as for example, by a wellhead closure apparatus described in copending application Ser. No. 218,482, filed Aug. 16, 1962 which is a continuation application of application, Ser. No. 830,587, filed Aug. 30, 1959, now abandoned, and represented in the drawing by numeral 59.

Figure 3:
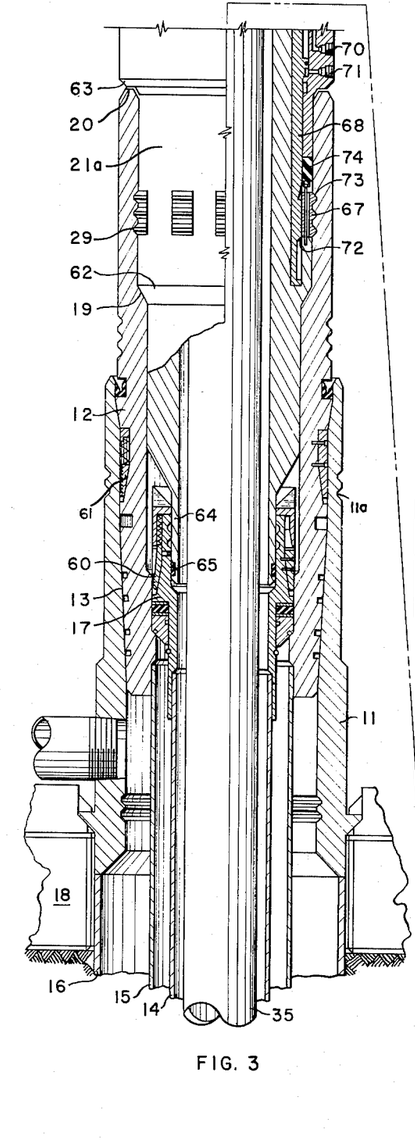
FIGURES 3 and 3A are views taken partly in longitudinal cross-section of the landing spool assembly of the present invention which is illustrated as being positioned in the top of an underwater well casinghead so as to suspend therein an additional string of well casing.

In FIGURE 3, the casing hanger 17 at the top of the casing string 14 is illustrated as being provided with spring-loaded hold-down slips 60. This casing hanger being preferably of the type described in copending application, Ser. No. 48,646, filed Aug. 10, 1960, now Patent No. 3,081,113. Similar hold-down slips 61 are provided on the casing and tubing suspension body 12 which tend to hold the suspension body in the casinghead 11 against any upward forces.

The lower portion 21a of the landing spool assembly of the present invention is illustrated in FIGURE 3 as being provided with a seating shoulder 62, formed on the outer wall thereof, for seating on the landing shoulder 19 of the casing and tubing suspension body 12. Alternatively, the dimensions of the landing spool member 21a could be adjusted so that the shoulder 63 formed thereon seats on the upper end 20 of the casing and tubing suspension body 12. The lower end 64 of the spool member 21a is preferably of a reduced diameter so as to fit within the top of the casing hanger 17. If desired, the lower end 64 of the spool member 21a is provided with seals 65 for forming a fluidtight connection with the casing hanger 17.

Figure 3A:
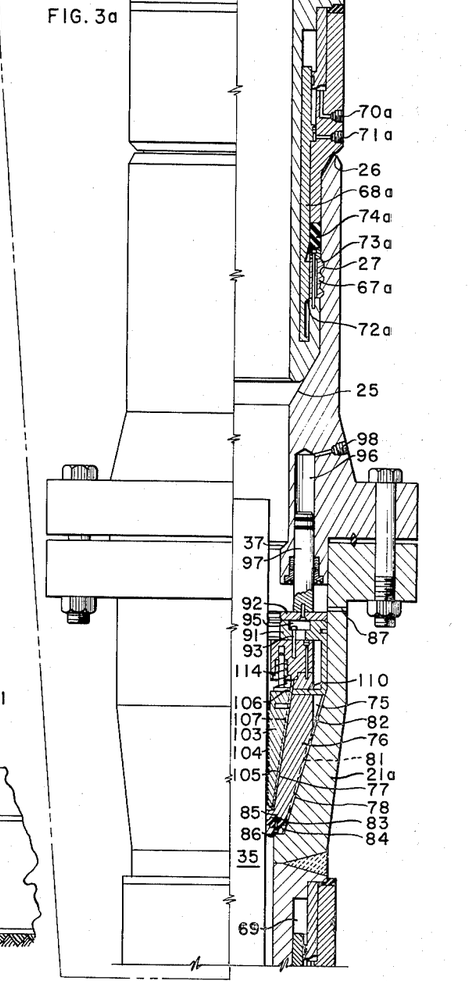

The lower portion 21a of the landing spool member is provided with a series of outwardly-extensible locking dogs 67 which are adapted to be forced outwardly into the annular groove or recesses 29 in the inner face of the suspension body 12, upon downward movement of an annular piston 68 which is vertically slidably movable in a chamber 69 (FIGURE 3A) formed in the spool member 21a. A pair of conduits 70 and 71 extend through the body of the spool member 21a from the outside thereof and are in communication with the upper and lower ends of the piston chamber 69. The piston member 68 is provided with a downwardly and inwardly sloping face 72 which forces the dogs 67 into their locking position, as shown in FIGURE 3. The outer upper edges of the locking dogs 67 are preferably bevelled, as at 73, whereby with the piston in its upper position, the dogs 67 are retracted into the body member 21a upon an upward pull of the body member with respect to the casing and tubing suspension body 12. The spool member 21a is also provided with an expansible seal 74, positioned either above or below the locking dogs 67 which is arranged to be expanded against the inner surface of the casing and tubing suspension body 12, as illustrated, upon movement of the tubular shaped piston element 68.

Positioned above the latching dog assembly 67 on the spool member 21a are a set of remotely-actuatable and inwardly-extensible slip-type casing-hanger means which are slidably mounted within a tapered slip bowl 75 in a normally retracted manner. A plurality of slips 76, preferably three in number, are mounted within the slip bowl 75, in sliding contact therewith, for both axial and radial movement. Both the inner and outer faces, 77 and 78, respectively, of the slips 76 are smooth with the outer face 78 having the same slope as that of the slip bowl 75 while the inner face 77 slopes in the same direction, although not necessarily at the same angle.

A number of grooves, equal in number to the number of segments or slips 76, are preferably cut in the sloping face of the slips 76, forming keyways 81 in which slip keys 82 may slide. The slip keys 82 are fixedly attached to the face of the slip bowl 75. Alternatively, the slip keys 82 could be affixed to the slips 76 while the keyways 81 can be cut in the slip bowl 75. By the use of keys 82 and keyways 81, the slip segments 76 remain positively aligned with respect to each other within the slip bowl 75, thus preventing movement of the segments of the slip around the inner surface of the bowl.

Mounted in each of the slip segments 76 is a segment of an annular sealing element or packer 83 which is held in place by a segment of a packer retaining ring 84 which may be secured, as by one or more bolts 85, to the body of the slip 76. When the sealing element 83 is in its operative position, as illustrated, that is, when the slips 76 and the packer retaining ring segments 84 have been forced against the seat 86 formed at the bottom of the bowl 75, the sealing element will be expanded so that its outer face seals against the slip bowl 76 while its inner face seals against the string of pipe or casing 35 centrally located in the center of the slip segments 76. At the same time the ends of each of the sealing element segments 83 expand circumferentially to seal against each other to form a complete sealing ring. Normally each slip segment 76 is releasably retained in its inoperative or retracted position by positioning means, such as a sear pin 87 which may be inserted through a hole in the wall of the assembly. As illustrated, the shear pin 87 is shown to have been broken. The shear pins are sealed in a fluidtight manner to prevent escape of annulus pressure. Positioned above the slip segments 76 is a slip-segment positioning ring 91 and a drive ring 92. Each slip segment 76 is connected to the slip-segment positioning ring 91 by a bolt 93 having a large head which is positioned in a radial slot 95 therein. The bolt 93 together with its attached slip segment 76 is allowed to move radially within the slot 95 below the drive plate 92.

Mounted in a pressure chamber 96 formed within the wall of the upper portion 21 of the spool assembly is a drive piston 97 which is preferably fixedly secured at its lower end to the drive ring 92. Each of the pressure chambers 96 of the assembly is in communication, through a radial conduit 98, with a source of pressure fluid by which a hydraulic fluid may be applied to the pistons. If desired, the drive pistons 97 could be connected directly to the top of the slip segments 76, but the use of a drive ring 92 is preferred to assure that equal force is applied to each of the slip segments 76 when they are being set against a pipe 35, and that the slip segments move together and travel at the same rate.

Slidably mounted for axial movement along the sloping inner face 77 of each of the slip segments 76 is an auxiliary slip segment or slip means 103 having a vertical serrated or toothed inner surface with the serrations running horizontally, and a sloping outer surface 105 which has the same angle as that of the inner surface of the slip segments 76. The wedge-shaped auxiliary slip segment or slip means 103 is of a thickness so that, when it is in its retracted or inoperative position, it does not extend inwardly toward the center of the landing spool assembly a distance greater than the inner surface of the top of the slip segment 76. Likewise, the slip segments 103 are of a size and thickness such that no portion of the slip segments 103, while in their retracted or inoperative position extends into the bore of the landing spool member 21a. Thus, the teeth on the inner surface of the auxiliary slip segments 103 are not subject to wear by tools passing through or rotating within the bore of the landing spool member 21–21a.

The auxiliary slip segments 103 are prevented from moving circumferentially by a key 106 formed on the inner surface of the slip segment 76 which mates with a keyway 107 cut or formed in the outer face of the auxiliary slip segment 103. The auxiliary slip segments 103 are normally held in a retracted or inoperative position by means of a positioning or retaining pin 110 which is carried by the slip segment 76. As the slip segments 76 move downwardly along the tapered slip bowl 75, the vertical outer surfaces of the slip segments 76 move away from the inner wall of the slip bowl recess, thus allowing the pin 110, which is secured to the ring 91, to be withdrawn from the auxiliary slip segment 103. When the pin 110 has been entirely withdrawn from the auxiliary slip segment 103, a compression spring 114 exerts a downward force against the top of the auxiliary slip segment 103 causing it to move down along the sloping inner face 77 of the slip segment 76 which in turn causes it to also move inwardly against the pipe or casing string 35 to lock the casing string in the position shown in FIGURE 2. Just prior to the serrated auxiliary slip 103 biting into the outer wall of the casing 35, the packer retaining ring at the bottom of the slip segment 76 contacts the seat 86 formed at the bottom of the bowl, thus causing the sealing elements 83 to be expanded radially both inwardly against the pipe 35 and outwardly against the slip bowl 75.

The wellhead unit which is to be seated in the top of the landing spool member of the present invention is provided with a latch mechanism, preferably of the design described with regard to FIGURE 3, which provides for a series of latching dogs 67a (FIGURE 3A) to engage grooves 27 upon downward movement of an actuating piston 68a which also expands a seal 74a to form a fluid-tight seal. Such a fluid is supplied through conduits 70a and 71a to opposite sides of the piston 68a.

In drilling an underwater well by the method described in copending patent application, Ser. No. 830,538, filed July 30, 1959, it will be assumed that the inner casing strings 14 and 15 (FIGURE 3) have been run in a well and cemented therein. A decision is made to drill deeper and insert still another string of casing prior to installing one or more strings or production tubing for producing the well. Thus the auxiliary casinghead extension spool member 21–21a of the present invention would be secured to the lower end of a blowout preventer as illustrated in FIGURES 1–1A and lowered into place in the casinghead where the lower end of the extension spool member 21–21a would be locked into the top of the casinghead or the casing and tubing suspension body 12 by applying a pressure fluid through port 70 (FIGURE 3) to engage the locking dogs 67. Pressure fluid would be supplied to port 70 through suitable flexible pressure conduits extending from the wellhead on the ocean floor to the operating platform above the surface of the water. With the extension spool member 21–21a and the blowout preventers secured to the well on the ocean floor, drilling operations would be continued until the desired depth of the well had been reached. The innermost string of casing 35 (FIGURE 3) would then be run down through the blowout preventers, spool piece and casinghead to the desired depth in the well. Cement could be pumped down through the casing string to cement the string in place. With the cement circulated into position outside the casing string 35, the string would then be lowered to the bottom of the well again. By the application of pressure fluid through port 98 (FIGURE 3A) the casing hanger slips 103 would be set against the outer surface of the casing 35 to anchor it in the well. A cutting tool of any well known type would then be lowered into the well to cut off the casing 35 above the slips 103. The tubing hanger 38 (FIGURE 2) together with one or more tubing strings 40 and 41 depending therefrom could be run into position and suspended from the landing surface 37 (FIGURE 3A) to the position shown in FIGURE 2. The blowout preventer 31 of FIGURE 1A could then be disconnected and withdrawn to the surface after pressure was applied through conduit 71a (FIGURE 3A), which conduit would be supplied by a pressure fluid from a hose extending to the operating platform above the surface of the water.

At other wellhead installations where a slip assembly containing slips 76 is not needed to seat an inner string of casing, or the outer string of concentric tubing strings, the well casing or tubing string being installed may be connected directly to the lower end of the landing spool member, as by screw threads, prior to running the well casing and spool member into its landed position within the casinghead. Alternatively, a normal casing hanger could be used in place of the slip-type hanger. If desired, multiple members of internally-latching casing head spool extension members may be employed, one above the other, and connected together after being run one at a time to the wellhead in a manner described hereinbelow with regard to both internally and externally latching extension spool members.

Instead of employing a single casinghead from which all strings of casing and tubing may be hung when drilling a well in accordance with copending patent application, Ser. No. 830,538, filed July 30, 1959, a casinghead 120 of the type shown in FIGURE 4 may be employed. The casinghead 120 is secured, as by welding, to the top of a conductor pipe 121 or large diameter casing and then run into a well which has previously been drilled until the casinghead is positioned on a well support member 122 which is normally seated on or anchored to the ocean floor. Well drilling operations are carried on through the casinghead 120 and conductor pipe 121 with a blowout preventer 123 secured to the casinghead 120 by means of a seal-and-lockdown head 124. The seal-and-lockdown head 124 is provided with a seal 125 for sealing against the casinghead 120, and locking dogs 126 adapted to be moved laterally by means of a piston 127 so as to latch or lock in a latching groove 128 formed on the outer wall of the casinghead 120. Conduits 130 and 131 are provided for injecting a pressure fluid to and from the spaces above and below the piston 127.

Figure 4:
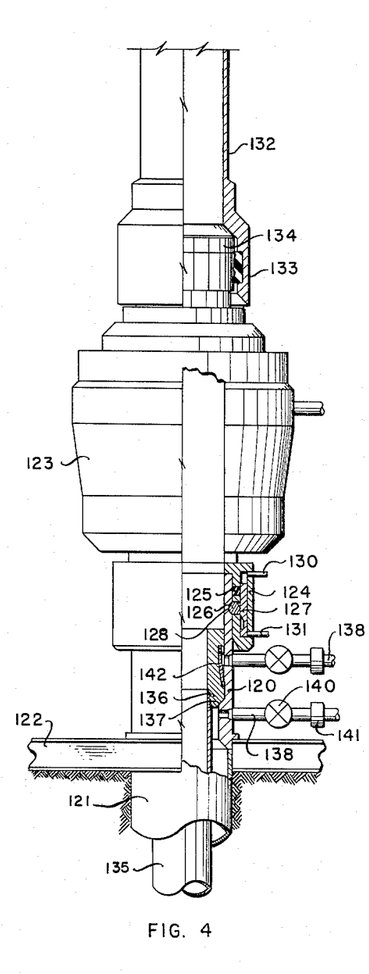
FIGURES 4, 5, 6 and 7 are diagrammatic views, taken in partial longitudinal cross-section illustrating successive arrangements of apparatus during the drilling and casing of a well while employing the apparatus of the present invention.

Extending upwardly from the blowout preventer 123 is a marine conductor pipe 132 that extends to a floating barge or other platform above the surface of the water and through which a drill stem extends during drilling operations. The lower end of the marine conductor pipe 132 is secured by means of a watertight connector element 133 to a vertical sleeve 134 on the blowout preventer, as described in copending application, Ser. No. 830,538, filed July 30, 1959. Drilling operations are then carried out so that a string of well casing 135, having a casing hanger 136 attached to the top thereof, can be run into the well and seated on the landing surface 137 formed within the inner wall of the casinghead 120. A side outlet is preferably provided in the wall of the casinghead 120 to which a conduit 138 may be attached for discharging fluid returns from the well during cementing operations when the casing string 135 is cemented in place. The conduit 138 is preferably provided with a remotely-controlled valve 140 and a quick-disconnect coupling 141 of any suitable type. The casing hanger 136 is preferably provided with hold-down slips 142 of the type described in copending patent application, Ser. No. 48,646, filed Aug. 10, 1960, now Patent No. 3,081,113.

Further drilling operations are carried out through the casing string 135 of FIGURE 4 and through the blowout preventer 123 and the marine conductor pipe 132. After the desired amount of hole has been drilled, the blowout preventer 123 and its seal-and-lockdown head 124 are removed.

Figure 5:
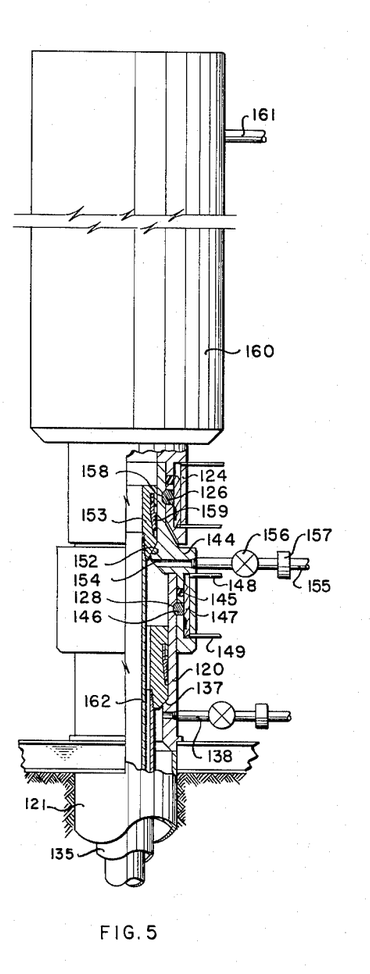

A casinghead extension spool member, in accordance with the present invention, is then run into place and latched on the outer surface of the casinghead 120, as shown in FIGURE 5. The extension spool member 144 differs from the previously described spool member in that the lower bore of the spool member 144 is of a diameter so that it may fit in sliding telescopic relation on the outside of the casinghead 120. A seal 145 and locking dogs 146 are adapted to seal against the outer surface of the casinghead 120 and lock in the annular groove 128 thereof when actuated by a hydraulically-operated piston 147. Conduits 148 and 149 are provided for introducing and discharging a pressure fluid from above and below the piston 147. A landing surface 152 is provided on the inner wall of the spool member 144 for seating a casing hanger 153 thereon. The body of the spool member 144 is also preferably provided with a port 154 therethrough to which a conduit 155 may be connected for handling fluid returns up the well during cementing operations. A remotely-controlled valve 156 and a quick-disconnect coupling 157 is also provided in the conduit 155 which, like conduit 138 in FIGURE 4, is preferably in the form of a flexible hose which extends upwardly through the water to the drilling platform above the surface of the water. The port 154 extends through the body of the spool member 144 below the seat 152 therein.

Figure 8:
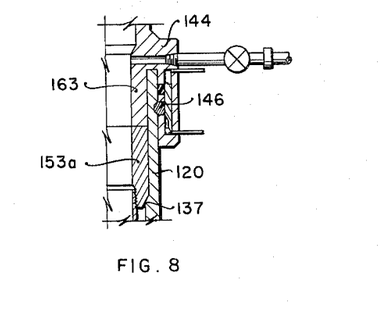
FIGURE 8 is a diagrammatic view, taken in cross-section, of a modified spool member of the present invention which is adapted to hold a casing hanger on its seat when the spool member is locked in place.

A circumferential groove 158 is provided in the outer wall of the spool member 144 near the upper end thereof for receiving the locking dogs 126 of the seal-and-lockdown head 124 which is secured to the bottom of a blowout preventer 160. The blowout preventer 160 is normally provided with a series of horizontally-extending arms 161 adapted to guide the blowout preventer and any equipment carried thereon into place on the underwater wellhead in a manner described in copending patent application Serial No. 830,538, filed July 30, 1959. A casing string 162 is hung from the casing hanger 153. Instead of employing hold-down slips 159 to hold the casing hanger 153 on the landing surface 152 of the spool member 144, the spool member 144 may be provided, as shown in FIGURE 8, with one or a series of hold-down spacer elements 163 which extend downwardly on the inside of the casing-head 210 a distance sufficient to contact the top of the casing hanger 153a. Thus, when the locking dogs 146 of the spool member 144 lock the spool member onto the casinghead 120 the spacer element 163, which may be annular in form, contacts or substantially contacts the top of the casing hanger 153a to keep it on the landing surface 137 within the casinghead.

Figure 6:
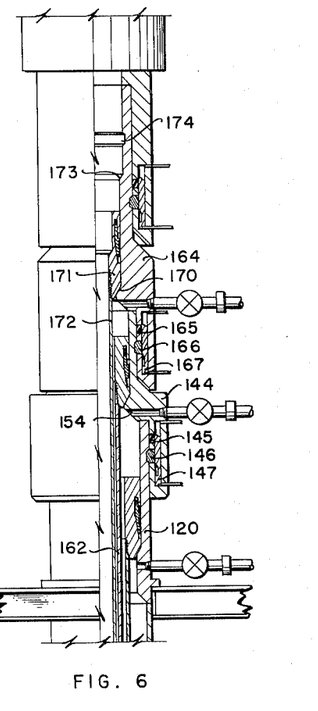

After more well footage has been drilled, another extension spool member 164 having a seal 165, locking dogs 166, and actuating member 167 is mounted on top of the spool member 144, as shown in FIGURE 6, after the blowout preventer 160 and its seal-and-lockdown head 124 (FIGURE 5) have been removed. The extension spool members 144 and 164 may be run into place on the wellhead in any suitable manner. For example, they may be secured to the seal-and-lockdown head 124 at the bottom of the blowout preventer and lowered into place at the same time the blowout preventer is positioned on the wellhead. Alternatively, they may be run into position on the wellhead by means of a running and retrieving tool as described in copending patent application, Serial No. 48,647, filed Aug. 10, 1960, now Patent No. 3,115,933.

The extension spool member 164 of FIGURE 6 is shown as being provided with a landing surface 170 for seating a casing hanger 171 thereon which has a string of casing 172 depending therefrom. Axially displaced from the landing surface 170 is a second landing surface 173 and a locking groove 174 for seating and locking therein a wellhead and tubing hold-down unit 175 of the type described in copending application Serial No. 834,096, filed Aug. 17, 1959, now Patent No. 3,064,735.

Figure 7:
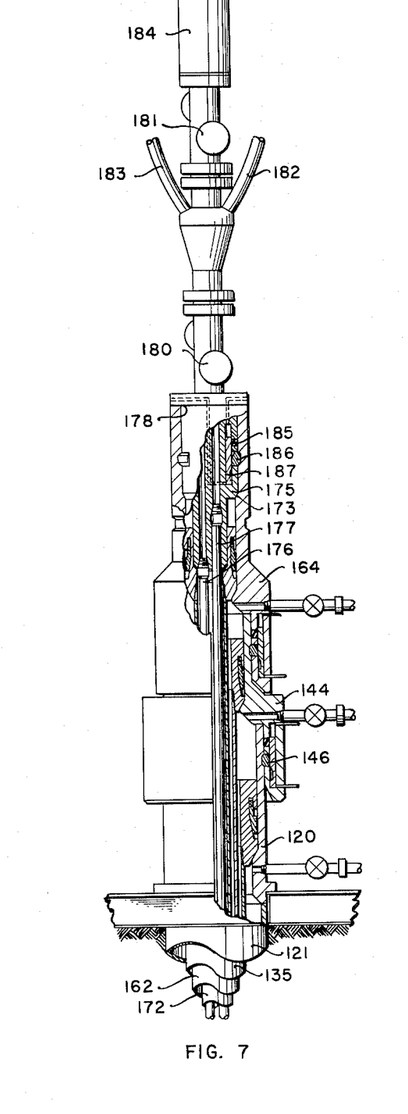

At the time the tubing hold-down unit 175 is run into the well (FIGURE 7), one or more parallel or concentric tubing strings 176 and 177 are also run into the well. Instead of seating on the landing surface 173 of the upper spool member 164, the hold-down unit 175 and equipment attached thereto may seat on the top of the spool member, as at 178. A production tree assembly including valves 180 and 181, flowlines 182 and 183 and a reentry lubricator head 184 are diagrammatically shown in FIGURE 7 as being attached to the top of the hold-down unit 175. However, it is to be understood that any suitable equipment could be secured to the top of the hold-down unit 175, such for example, as a well work-over assembly including a blowout preventer (not shown). The hold-down unit is provided with a seal, locking dogs, and actuating piston as described in copending application Serial No. 834,096, filed Aug. 17, 1959, now Patent No. 3,064,735.

Figure 9:
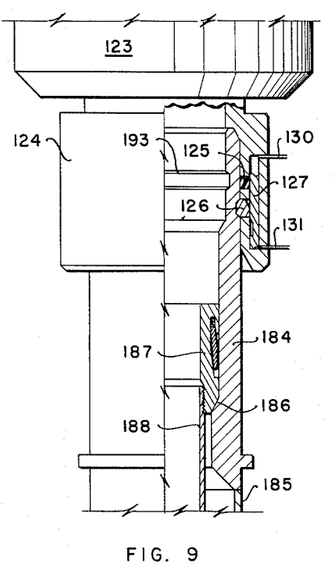
FIGURES 9, 10, 11 and 12 are diagrammatic views taken in partial longitudinal cross-section, illustrating successive arrangements of equipment during the drilling and casing of a well when utilizing the spool members of the present invention; and, FIGURE 13 is a view taken in partial longitudinal cross-section of another form of an extension spool member of the present invention.
Figure 10:
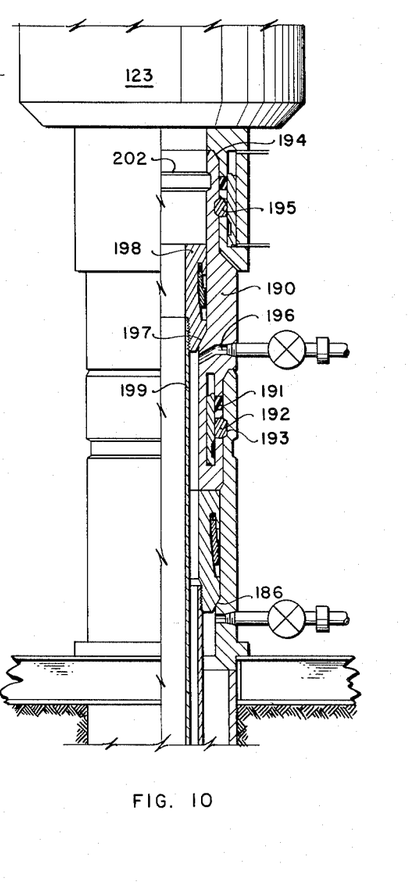

The sequence of arranging and assembling a wellhead during drilling operations so as to incorporate the spool members of the present invention is shown in FIGURES 9, 10, 11 and 12, which are identical to the description of the operation with regard to FIGURES 4, 5, 6 and 7 except that internally-latching spool members are employed rather than externally-latching spool members. In FIGURE 9 a casinghead 184 is illustrated as being welded to a conductor 185 which is cemented in a well. Seated on the landing surface 186 of the casinghead is a casing hanger 187 having a string of casing 188 depending therefrom. A blowout preventer with a seal-and-lockdown head 124 is shown as being secured to the top of the casinghead. In FIGURE 10 an internally latching spool member 190 having an inwardly disposed seal 191 and inwardly movable locking dogs 192 is shown as being latched to the annular groove 193 on the inner wall of the casinghead 184. The spool member 190 is provided with a landing surface 194 on the outer surface thereof and a locking groove or shoulder 195 for locking the seal-and-lockdown unit 124 of the blowout preventer 123 thereon. A fluid conduit or passageway 196 is provided through the wall of the spool member 190 for circulating fluid therethrough. Additionally, the spool member 190 is provided with a landing surface 197 for receiving a casing hanger 198 having a casing string 199 depending therefrom.

Figure 11:
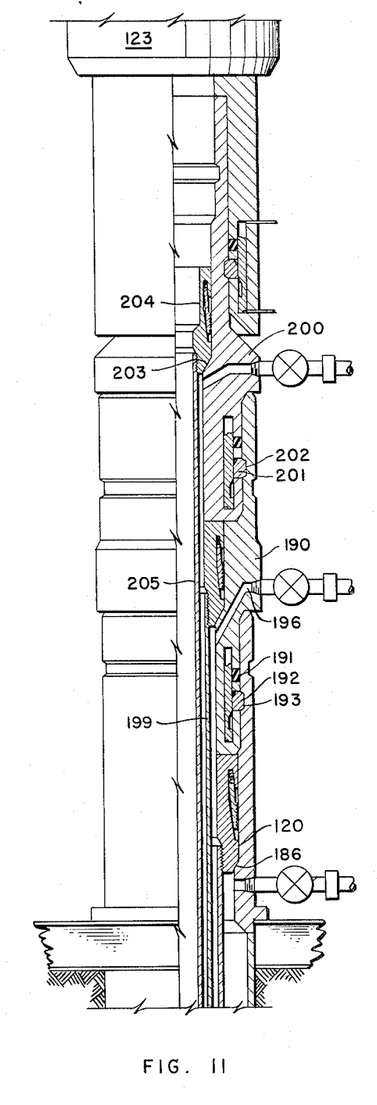

In FIGURE 11 another spool member 200, which is similar to spool member 190, except being smaller in diameter, has locking dogs 201 for locking in the peripheral groove 202 formed on the inner wall of the lower spool member 190. Seated on a landing surface 203 formed within the inner wall of the spool member 200 is a casing hanger 204 having an inner string of casing 205 hanging therefrom.

Figure 12:
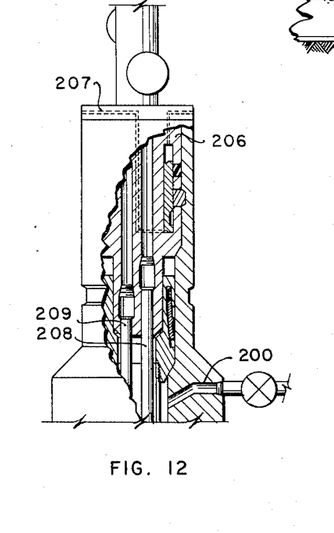

In FIGURE 12 the upper spool member 200 of FIGURE 11 is shown as being closed by a lockdown unit 206 at the bottom of a production package or Christmas tree 207 which has depending therefrom one or more tubing strings 208 and 209.

Figure 13:
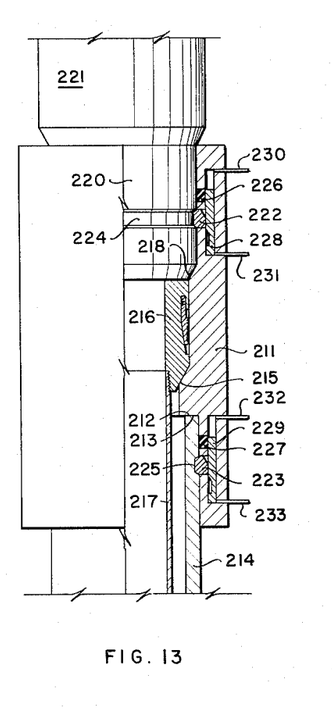

Another form of the spool member of the present invention is shown in FIGURE 13 which comprises a body member 211 having a seating surface 212 adapted to fit on the landing surface 213 of a casinghead 214 or another well member. Also formed on the inner wall of the spool member 211 is a landing surface 215 adapted to receive a casing hanger 216 having a casing string 217 depending therefrom. A second landing surface 218 is formed on the inner wall of the spool member 211 for receiving and seating thereon the lower end of a well component such for example as a lockdown stub 220 which may be attached to the lower end of a production wellhead unit 221 or any other suitable unit that may be positioned on the wellhead.

Carried within the body of the spool member 211 are upper and lower sets of locking dogs 222 and 223 which are adapted to be received and locked in grooves 224 and 225 formed on the outer surfaces of the lockdown stub 220 and the casinghead 214, respectively. The spool member body 211 is also provided with upper and lower annulus seals 226 and 227, together with actuating elements or pistons 228 and 229, respectively. Fluid conduits 230, 231, 232 and 233 are provided for applying a pressure fluid to the actuating pistons 228 and 229. It is quite apparent that the landing surface on the spool member of FIGURE 13 could be reversed as well as the sets of locking dogs so that the dogs could lock from the inside rather than the outside.

I claim as my invention:

1. Apparatus for use in wellhead installations installed below the surface of a body of water from a remotely-positioned operating platform positioned above said body of water, said apparatus comprising an upwardly-extending tubular well member having a bore therethrough forming vertical walls means fixedly positioned above a well bore, first landing surface means formed on the outer surface of said wall means of said well member, an extension spool member having a bore therethrough forming vertical wall means and adapted to be secured as an independent unit to said well member, said spool member being connectible in telescopic relation on the outside of said vertical wall means of said well member and having second landing surface means formed in the inner wall thereof for seating a wellhead unit thereon and seating surface means formed on the inner wall thereof for seating on at least a portion of the first landing surface means of said well member, said spool member having third landing surface means formed on the inner wall thereof for seating pipe hanger means thereon, laterally-extendible and retractable hold-down latching means carried in the wall of said spool member and positioned in engageable relationship with at least a portion of the adjacent wall means of said well member in telescopic relation with said spool member below the seating surface means, and remotely-operable actuating means operatively engageable with said latching means for selectively moving said latching means to engaged and disengaged positions.

2. An apparatus for facilitating wellhead operations carried out below the surface of a body of water from a remotely positioned operating platform positioned above said body of water, said apparatus comprising a large-diameter well casing fixedly positioned in a wellbore, a casinghead mounted on the top of said large-diameter well casing and having at least upper and lower landing surfaces on the inner wall thereof, a casing hanger having a casing string depending therefrom and seated on the lower landing surface of said casinghead, an auxiliary casinghead extension spool member having a bore therethrough and adapted to be secured as an independent unit to said casinghead with an upper landing surface on said extension spool member and a seating surface on the outer surface of said extension spool member intermediate the ends thereof for seating on the upper landing surface of said casinghead, the lower end of said extension spool member being concentrically positioned in the top of said casinghead, first laterally-extendible and retractable hold-down latching means carried on the outside of said extension spool member for engaging the inside of said casinghead when said member is seated within said casinghead, inwardly-extensible slip-type casing hanger means slidably mounted on said extension spool member in a normally retracted position in said spool adjacent the bore thereof, a wellhead unit mounted coaxially on the top of said casinghead extension spool member and seated on the upper landing surface thereof, second laterally-extendible and retractable hold-down latching means carried on the outside of said wellhead unit for engaging the inner wall of said extension spool member near the upper end thereof, and remotely-operable actuating means operatively engageable with said latching means for selectively moving said latching means to engaged and disengaged positions.

3. An apparatus for facilitating wellhead operations carried out below the surface of a body of water from a remotely positioned operating platform positioned above said body of water, said apparatus comprising a large-diameter well casing fixedly positioned in a well bore, a casinghead secured to the top of said large-diameter well casing and having at least upper and lower landing surfaces and latching recess means all being formed on the inner wall thereof, a casing hanger having a casing string depending therefrom and seated on the lower landing surface of said casinghead, an auxiliary casinghead extension spool member having a bore therethrough and adapted to be secured as an independent unit to said casinghead there being a seating surface on the outer surface of said extension spool member intermediate the ends thereof for seating on the upper landing surface of said casinghead, the lower end of said extension spool member being concentrically positioned in the top of said casinghead, first laterally-extendible and retractable hold-down latching means carried on the outside of said extension spool member for engaging said latching recess means on the inside of said casinghead when said member is seated within said casinghead, inwardly-extensible slip-type casing hanger means slidably mounted on said extension spool member in a normally retracted position in a recessed portion of said spool piece adjacent the bore thereof, first landing surface means formed on the inner wall of said extension spool member above said casing hanger means thereof for seating a tubing hanger therein, second landing surface means on said spool piece member above said first landing surface means for seating a wellhead unit thereon, and remotely-operable actuating means operatively engageable with said latching means for selectively moving said latching means to engaged and disengaged positions.

4. An apparatus for facilitating wellhead operations carried out below the surface of a body of water from a remotely positioned operating platform positioned above said body of water, said apparatus comprising a large-diameter well casing fixedly positioned in a wellbore, a casinghead secured to the top of said large-diameter well casing and having at least upper and lower landing surfaces and latching recess means all being formed on the inner wall thereof, a casing hanger having a casing string depending therefrom and seated on the lower landing surface of said casinghead, an auxiliary casinghead extension spool member having a bore therethrough and adapted to be secured as an independent unit to said casinghead therebeing a seating surface on the outer surface of said extension spool member intermediate the ends thereof for seating on the upper landing surface of said casinghead, the lower end of said extension spool member being concentrically positioned in the top of said casinghead, first laterally-extendible and retractable hold-down latching means carried on the outside of said extension spool member for engaging said latching recess means on the inside of said casinghead when said member is seated within said casinghead, inwardly-extensible slip-type casing hanger means slidably mounted on said extension spool member in a normally retracted position in a recessed portion of said spool piece adjacent the bore thereof, first landing surface means formed on the inner wall of said extension spool member above said casing hanger means thereof for seating a tubing hanger therein, second landing surface means on said spool piece member above said first landing surface means for seating a wellhead unit thereon, a wellhead unit mounted coaxially on the top of said casinghead extension spool member and seated on the second landing surface means thereof, second laterally-extendible and retractable hold-down latching means carried on the outside of said wellhead unit for engaging the inner wall of said extension spool member near the upper end thereof, and remotely-operable actuating means operatively engageable with said latching means for selectively moving said latching means to engaged and disengaged positions.

5. An apparatus for facilitating wellhead operations carried out below the surface of a body of water from a remotely positioned operating platform positioned above said body of water, said apparatus comprising a large-diameter well casing fixedly positioned in a wellbore, a casinghead secured to the top of said large-diameter well casing and having at least upper and lower landing surfaces and latching recess means all being formed on the inner wall thereof, a casing hanger having a casing string depending therefrom and seated on the lower landing surface of said casinghead, an auxiliary casinghead extension spool member having a bore therethrough and adapted to be secured as an independent unit to said casinghead, said spool member having an upper landing surface for seating a wellhead unit thereon, and a seating surface on the outer surface of said extension spool member intermediate the ends thereof for seating on the upper landing surface of said casinghead, the lower end of said extension spool member being concentrically positioned in the top of said casinghead, outwardly-extensible and retractable hydraulically-operated hold-down latching means carried on the outside of said extension spool member for engaging said latching recess means on the inside of said casinghead when said member is seated within said casinghead, pressure fluid conduit means in the wall of said spool member from the outside thereof and in communication with said latching means for supplying an actuating pressure fluid thereto, and inwardly-extensible hydraulically-operated slip-type casing hanger means slidably mounted on said extension spool member in a normally retracted position in a recessed portion of said spool adjacent the bore thereof.

6. An apparatus for facilitating wellhead operations carried out below the surface of a body of water from a remotely positioned operating platform positioned above said body of water, said apparatus comprising a large-diameter well casing fixedly positioned in a well bore, a casinghead secured to the top of said large-diameter well casing and having at least upper and lower landing surfaces and latching recess means all being formed on the inner wall thereof, a casing hanger having a casing string depending therefrom and seated on the lower landing surface of said casinghead, an auxiliary casinghead extension spool member having a bore therethrough and adapted to be secured as an independent unit to said casinghead there being seating surface on the outer surface of said extension spool member intermediate the ends thereof for seating on the upper landing surface of said casinghead, the lower end of said extension spool member being concentrically positioned in the top of said casinghead, first remotely-actuatable and outwardly-extensible and retractable hydraulically-operated hold-down latching means carried on the outside of said extension spool member for engaging said latching recess means on the inside of said casinghead when said member is seated within said casinghead, first conduit means through the wall of said spool member from the outside thereof and in communication with said latching means for supplying an actuating pressure fluid thereto, inwardly-extensible hydraulically-operated slip-type casing hanger means slidably mounted on said extension spool piece member in a normally retracted position in a recessed portion of said spool piece adjacent the bore thereof, second conduit means through the wall of said spool member from the outside thereof and in communication with said casing hanger means for supplying an actuating pressure fluid thereto, first landing surface means formed on the inner wall of said extension spool piece member above said casing hanger means thereof for seating a tubing hanger therein, second landing surface means on said spool piece member above said first landing surface means for seating a wellhead unit therein, a wellhead unit mounted coaxially on top of said casinghead spool member and seated on the second landing surface means thereof, second outwardly-extensible hydraulically-operated hold-down latching dog means carried on the outside of said wellhead unit for engaging the inner wall of said extension spool piece member near the upper end thereof, and cooperating latching recess means formed on the inner wall of said extension spool piece member near the top thereof for engaging said second latching dog means.

7. An underwater wellhead assembly comprising a well casing fixedly positioned in a well bore, a casinghead fixedly secured to the top of said well casing, said casinghead having first and second landing surfaces formed on the inner wall thereof, a first casing hanger seated on said first landing surface and having a first casing string depending therefrom, a first extension spool member having a bore therethrough forming vertical wall means and being connectible in telescopic relation with said casinghead as an independent unit therewith, said first spool member having first seating means on the outer surface thereof engageable with said second landing surface of said casinghead and third and fourth landing surfaces formed on the inner wall thereof, a second casing hanger seated on said third landing surface and having a second casing string depending therefrom, a second extension spool member having a bore therethrough forming vertical wall means and being connectible in telescopic relation with said first spool member, said second spool member having second seating means on the outer surface thereof engageable with said fourth landing surface of said first spool member and fifth and sixth landing surfaces on the inner wall of said second spool member of seating well members thereon, laterally-extendible and retractable hold-down latching means carried in the wall of each of said spool members and positioned in engageable relationship with at least one adjacent wall of the member in telescopic relation therewith, and remotely-operable actuating means operatively engageable with said latching means for selectively moving said latching means to engaged and disengaged positions.

8. An underwater wellhead assembly comprising a well casing fixedly positioned in a wellbore, a casinghead fixedly secured to the top of said well casing, said casinghead having first and second landing surfaces formed on the inner wall thereof, a first casing hanger seated on said first landing surface and having a first casing string depending therefrom, a first extension spool member having a bore therethrough forming vertical wall means and being connectible in telescopic relation with said casinghead as an independent unit therewith, said first spool member having first seating means on the outer surface thereof engageable with said second landing surface of said casinghead and third and fourth landing surfaces formed on the inner wall thereof, a second casing hanger seated on said third landing surface and having a second casing string depending therefrom, a second extension spool member having a bore therethrough forming vertical wall means and being connectible in telescopic relation with said first spool member, said second spool member having second seating means on the outer surface thereof engageable with said fourth landing surface of said first spool member and fifth and sixth landing surfaces on the inner wall of said second spool member, a pipe hanger seated on said fifth landing surface and having a pipe string depending therefrom and a well member seatable on said sixth landing surface of said second spool member, laterally-extendible and retractable hold-down latching means carried on the wall of each of said spool members and positioned in engageable relationship with at least one adjacent wall of the member in telescopic relation therewith, and remotely-operable actuating means operatively engageable with said latching means for selectively moving said latching means to engaged and disengaged positions.

9. An underwater wellhead assembly comprising a well casing fixedly positioned in a well bore, a casing fixedly secured to the top of said well casing, said casinghead having first and second landing surfaces formed on the inner wall thereof, a first casing hanger seated on said first landing surface and having a first casing string depending therefrom, a first extension spool member having a bore therethrough forming vertical wall means and being connectible in telescopic relation with said casinghead as an independent unit therewith, said first spool member having first seating means on the outer wall thereof engageable with said second landing surface of said casinghead and third and fourth landing surfaces formed on the inner wall thereof, a second casing hanger seated on said third landing surface and having a second casing string depending therefrom, a second extension spool member having a bore therethrough forming vertical wall means and being connectible in telescopic relation with said first spool member, said second spool member having second seating means on the outer wall thereof engageable with said fourth landing surface of said first spool member and a fifth landing surface on the inner wall thereof, a well member seatable on said fifth landing surface of said second spool member, laterally-extendible and retractable hold-down latching means carried in the wall of each of said spool members and positioned in engageable relationship with at least one adjacent wall of the member in telescopic relation therewith, and remotely-operable actuating means operatively engageable with said latching means for selectively moving said latching means to engaged and disengaged postions.

10. An underwater wellhead assembly comprising a well casing fixedly positioned in a well bore, a casinghead fixedly secured to the top of said well casing, said casinghead having a first landing surface on the inner wall thereof and a second landing surface formed on the outer wall thereof, a first casing hanger seated on said first landing surface and having a first casing string depending therefrom, a first extension spool member having a bore therethrough forming vertical wall means and being connectible in telescopic relation with said casinghead as an independent unit therewith, said first spool member having first seating means on the inner wall thereof engageable with said second landing surface of said casinghead and a third landing surface formed on the inner wall thereof and a fourth landing surface formed on the outer wall thereof, a second casing hanger seated on said third landing surface and having a second casing string depending therefrom, a second extension spool member having a bore therethrough forming vertical wall means and being connectible in telescopic relation with said first spool member, said second spool member having second seating means on the inner wall thereof engageable with said fourth landing surface of said first spool member and a fifth landing surface on the inner wall thereof, a well member seatable on said fifth landing surface of said second spool member, laterally-extendible and retractable hold-down latching means carried in the wall of each of said spool members and positioned in engageable relationship with at least one adjacent wall of the member in telescopic relation therewith, and remotely-operable actuating means operatively engageable with said latching means for selectively moving said latching means to engaged and disengaged positions.

11. An apparatus for facilitating wellhead operations carried out below the surface of a body of water from a remotely-positioned operating platform positioned above said body of water, said apparatus comprising a large-diameter well casing fixedly positioned in a well bore, a casinghead mounted on top of said large-diameter well casing and having at least one landing surface formed thereon, a casinghead extension spool member having a bore therethrough and adapted to be secured as an independent unit to said casinghead, said spool member having a landing surface formed in the bore thereof at a point above the upper end of the casinghead when seated therein for seating hanger means of a wellhead unit thereon, and said spool member having a seating surface positioned thereon for seating on a landing surface of said casinghead, a portion of said spool member being in telescopic relation with a portion of said casinghead, hanger means for said wellhead unit positioned on said landing surface of said spool member, laterally-extendible and retractable hold-down latching means carried on the wall of said extension spool member for engaging the portion of the adjacent wall of said casinghead in telescopic relationship with said spool member when said spool member is seated on said casinghead, and remotely-operable actuating means operatively engageable with said latching means.

12. An apparatus for facilitating wellhead operations carried out below the surface of a body of water from a remotely-positioned operating platform positioned above said body of water, said apparatus comprising a large-diameter well casing fixedly positioned in a well bore, a casinghead mounted on top of said large-diameter well casing and having at least upper and lower landing surfaces formed thereon, an auxiliary casinghead extension spool member having a bore therethrough and adapted to be secured as an independent unit to said casinghead, said spool member having an upper landing surface formed in the bore thereof at a point above the upper end of the casinghead when seated therein for seating hanger means of a wellhead unit thereon, and said spool member having a seating surface on the outer surface thereof for seating on the upper landing surface of said casinghead, a portion of said spool member being in telescopic relation with a portion of said casinghead, hanger means for said wellhead unit positioned on said landing surface of said spool member, laterally extendible and retractable hold-down latching means carried on the outside of said extension spool member for engaging the inside of said casinghead in telescopic relationship with said spool member when said spool member is seated on said casinghead, and remotely-operable actuating means operatively engageable with said latching means.

13. The apparatus of claim 12 including a casing hanger having a casing string depending therefrom and seated on the lower landing surface of said casinghead, and remotely-actuatable and inwardly-extensible slip-type casing hanger means slidably mounted on said extension spool member in a normally retracted position in said spool adjacent the bore thereof.

14. The apparatus of claim 13 wherein the lower end of said spool member is of a diameter to fit within the casing hanger seated within said casinghead, with sealing means carried by the lower end of said spool piece member on the outside thereof for sealing against said casing hanger.

15. Apparatus for use in wellhead installations installed below the surface of a body of water from a remotely-positioned operating platform positioned above said body of water, said apparatus comprising an upwardly-extending tubular well member having a bore therethrough forming vertical wall means fixedly positioned above a well bore, first landing surface means formed on said wall means of said well member, an extension spool member having a bore therethrough forming vertical wall means and adapted to be secured as an independent unit to said well member, said spool member being connectible in telescopic relation with said vertical wall means of said well member and having second landing surface means formed in the wall means thereof at a point above the upper end of said well member when seated therein for seating hanger means of a wellhead unit thereon, said spool member having seating surface means formed on the wall means in telescopic relationship with said well member for seating on at least a portion of said first landing surface means of said well member, hanger means for said wellhead unit positioned on said second landing surface means of said spool member, laterally-extendible and retractable hold-down latching means carried in the wall of said spool member and positioned in engageable relationship with at least the portion of the adjacent wall means of said well member in telescopic relationship with said spool member, and remotely-operable actuating means operatively engageable with said latching means for selectively moving said latching means to engaged and disengaged positions.

16. The apparatus of claim 15 wherein said spool member has third landing surface means formed on the inner wall thereof for seating pipe hanger means thereon.

17. Apparatus for use in wellhead installations installed below the surface of a body of water from a remotely-positioned operating platform positioned above said body of water, said apparatus comprising an upwardly-extending tubular well member having a bore therethrough forming vertical wall means fixedly positioned above a well bore, first landing surface means formed on the outer surface of said wall means of said well member, an extension spool member having a bore therethrough forming vertical wall means and adapted to be secured as an independent unit to said well member, said spool member being connectible in telescopic relation with said vertical wall means of said well member and having second landing surface means formed in the wall means thereof at a point above the upper end of said well member when seated therein for seating hanger means of a wellhead unit thereon, said spool member having seating surface means formed on the inner wall means thereof for seating on at least a portion of said first landing surface means of said well member, hanger means for said wellhead unit positioned on said second landing surface means of said spool member, laterally-extendible and retractable hold-down latching means carried in the wall of said spool member and positioned in engageable relationship with at least the portion of the adjacent wall means of said well member in telescopic relationship with said spool member, and remotely-operable actuating means operatively engageable with said latching means for selectively moving said latching means to engaged and disengaged positions.

18. The apparatus of claim 17 wherein said spool member has third landing surface means formed on the inner wall thereof for seating pipe hanger means thereon.

19. Apparatus for use in wellhead installations installed below the surface of a body of water from a remotely-positioned operating platform positioned above said body of water, said apparatus comprising
an upwardly-extending tubular well member having a bore therethrough forming vertical wall means fixedly positioned above a well bore,
first landing surface means formed on the inner surface of said wall means of said well member,
an extension spool member having a bore therethrough forming vertical wall means and adapted to be secured as an independent unit to said well member,
said spool member being connectible in telescopic relation with said vertical wall means of said well member and having second landing surface means formed in the wall means thereof at a point above the upper end of said well member when seated therein for seating hanger means of a wellhead unit thereon, said spool member having seating surface means formed on the outer wall means thereof for seating on at least a portion of said first landing surface means of said well member,
hanger means for said wellhead unit positioned on said second landing surface means of said spool member,
laterally-extendible and retractable hold-down latching means carried in the wall of said spool member and positioned in engageable relationship with at least the portion of the adjacent wall means of said well member in telescopic relationship with said spool member, and
remotely-operable actuating means operatively engageable with said latching means for selectively moving said latching means to engaged and disengaged positions.

20. The apparatus of claim 19 wherein said spool member has third landing surface means formed on the inner wall thereof for seating pipe hanger means thereon.

References Cited by the Examiner

UNITED STATES PATENTS

| | | | |
|---|---|---|---|
| 1,696,844 | 12/28 | Haynes et al. | 285—133 |
| 1,836,565 | 12/31 | Wigle | 285—133 |
| 2,077,480 | 4/37 | Humason | 166—88 |
| 2,118,094 | 5/38 | McDonough et al. | 166—89 X |
| 2,660,248 | 11/53 | Brown | 166—88 |
| 2,897,895 | 8/59 | Ortloff | 166—75 X |
| 2,962,096 | 11/60 | Knox | 166—75 |
| 3,004,602 | 10/61 | Kofahl | 166—97 |
| 3,021,909 | 2/62 | Postlewaite | 175—7 |
| 3,023,012 | 2/62 | Wilde | 175—7 |
| 3,032,125 | 5/62 | Hiser et al. | 166—66.5 |
| 3,054,449 | 9/62 | Schramm et al. | 166—66.5 |
| 3,064,735 | 11/62 | Bauer et al. | 166—66.5 |
| 3,080,921 | 3/63 | Lacy | 166—46 X |
| 3,086,590 | 4/63 | Jackson et al. | 166—66.5 |
| 3,099,317 | 7/63 | Todd | 166—66.5 |
| 3,102,591 | 9/63 | Raulins | 166—66.5 X |
| 3,105,552 | 10/63 | Haeber et al. | 166—75 |

CHARLES E. O'CONNELL, *Primary Examiner.*

BENJAMIN BENDETT, *Examiner.*